Aug. 22, 1950   O. V. HADLEY ET AL   2,519,756
SHAFT SEAL FOR ELECTRICAL CIRCUIT CONTROL
Filed Jan. 11, 1946
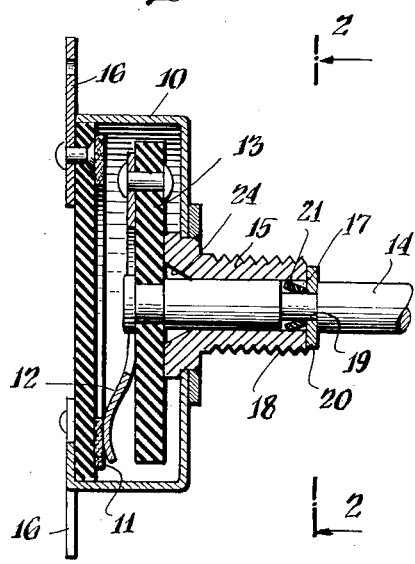
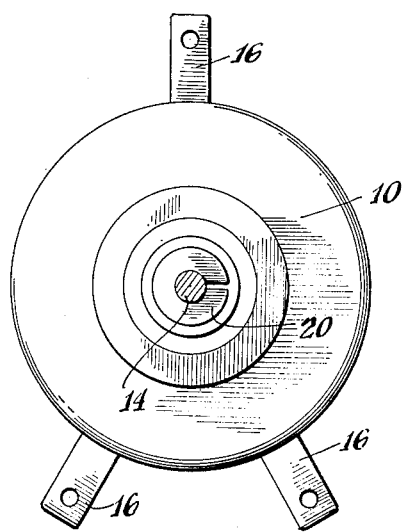
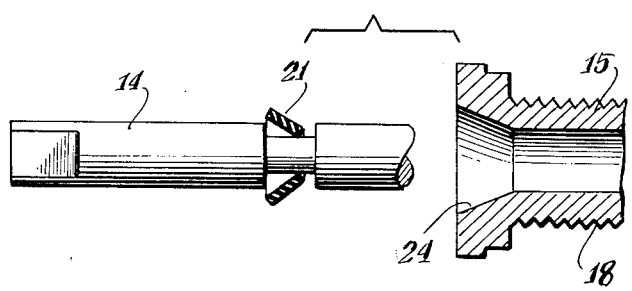
INVENTORS
Oscar V. Hadley
Earl E. Schwarzenbach
BY
Nicholas Langer
ATTORNEY Patented Aug. 22, 1950

2,519,756

UNITED STATES PATENT OFFICE 2,519,756

SHAFT SEAL FOR ELECTRICAL CIRCUIT CONTROL

Oscar V. Hadley, Plainfield, and Earl E. Schwarzenbach, Indianapolis, Ind., assignors to P. R. Mallory & Co., Inc., Indianapolis, Ind., a corporation of Delaware Application January 11, 1946, Serial No. 640,610

6 Claims. (Cl. 308—36.1)

This invention relates to a sealed control shaft construction for adjustable electrical devices.

An object of this invention is to improve the construction and sealing of control shafts.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

Figure 1 is a sectional view of a variable resistor embodying the novel control shaft construction;

Figure 2 is a sectional view taken along the line 2—2 of Figure 1;

Figure 3 is a view of the control shaft, bushing, and sealing washer with the parts in disassembled relation; and Figure 4 is a perspective view of a sealing washer.

While a preferred embodiment of the invention is described herein, it is contemplated that considerable variation may be made in the method of procedure and the construction of parts without departing from the spirit of the invention. In the following description and the claims, parts will be identified by specific names for convenience, but they are intended to be as generic in their application to similar parts as the art will permit.

In adjustable electric devices, it is frequently desirable to or necessary to provide a sealing arrangement for the control shaft so that the apparatus in which the electrical device is used may be operated under extreme conditions of moisture or humidity or temporarily submerged in water without damage. It has heretofore been proposed to form a slot in the control shaft and mount a grommet or ring in this slot to seal the control shaft and the bushing of the device. However, such a sealing ring is usually moulded by a comparatively expensive process and such construction is rather critical and unreliable in actual operation. In accordance with this invention, a sealing washer is utilized which may be conveniently and cheaply stamped from sheet material. The washer is preferably mounted in an extension of the groove normally provided for the control shaft clinch ring so that the washer seals the bushing and the extended portion of the control shaft groove. When assembled in this manner, the washer is flexed in addition to being deformed by tensional and compressive stresses with the result that reliable sealing action is obtained and the adjustment of the washer is not critical. The inner part of the bushing may be countersunk or recessed to permit rapid assembly of the shaft and bushing as well as to minimize the danger of breaking the sealing ring during assembly.

In the drawings, the invention is shown as applied to a variable resistance device but it will be distinctly understood that the sealing arrangement may be utilized with other types of variable electrical devices such as switches or variable condensers, for example. The device as shown comprises a casing 10 within which a resistance element 11 is supported in a manner well understood in the art. The element 11 is engaged by a contact 12 secured to a block of sheet insulation 13, the contact 12 being suitably connected to the control shaft 14 to provide a variable resistance connection to the element 11. A bushing 15 for rotatably supporting the shaft is mounted in a suitable opening formed in the front of the casing 10. Terminals 16 are provided for making electrical connections to the resistor in any suitable manner.

According to the invention, a circumferential groove 17 is formed in the control shaft, the inner portion 18 of the groove being located within the bushing 15 and the outer portion 19 of the groove extending outside the bushing. A clinch ring 20 is mounted in the outer groove portion 19 and bears against the outer end of the bushing 15 so that longitudinal movement of the control shaft with respect to the bushing is prevented. A washer 21, which is formed from rubber or other suitable resilient material, is seated upon the inner grooved portion 18 of the control shaft, the peripheral parts of the washer bearing against the bushing 15 to thereby seal the control shaft against moisture or excessive humidity. It will be apparent that the washer is deformed from its original shape as indicated in Figure 4 and subjected to flexure as well as to compressive and tensional stresses. The inner end of the bushing is countersunk or conically recessed as at 24 in order to facilitate assembly of the control shaft and the bushing.

The manner in which the parts are assembled is shown in Figure 3. It will be understood that the washer is sufficiently resilient that it may be pulled over the enlarged portion of the shaft and seated in the groove, as shown. Although the washer is deformed to some extent at this time, it will be apparent that the peripheral portions thereof extend outwardly beyond the adjacent parts of the shaft. As the shaft and the bushing are assembled, the washer engages the countersunk portion 24 and is gradually forced to assume the position shown in Figure 1. It will be apparent that the provision of the recessed portion 24 facilitates rapid assembly of the shaft and bushing. Furthermore, since the washer is gradually forced to its final position in the bushing, there is little danger of breaking the sealing ring as a result of rapid flexing of the washer.

While the present invention, as to its objects and advantages, has been described herein as carried out in a specific embodiment thereof, it is not desired to be limited thereby but it is intended to cover the invention broadly within the spirit and scope of the appended claims.

What is claimed as new and desired to be secured by Letters Patent is:

1. A sealed control shaft construction for an adjustable electrical device comprising a bushing, a circumferentially grooved control shaft extending through said bushing, a clinch ring, a portion of the groove being located within the bushing and terminated by said ring, said groove having a length substantially greater than its width, and a conical sealing washer abutting said clinch ring seated on said grooved portion, the peripheral parts of the washer being forced into contact with the bushing by the resiliency of the washer material to thereby seal said control shaft.

2. A sealed control shaft construction for an adjustable electrical device comprising a bushing, a circumferentially grooved control shaft extending through said bushing, a clinch ring, a portion of the groove being located within the bushing and terminated by said ring, said groove having a length substantially greater than its width, means for preventing longitudinal movement of the shaft with respect to the bushing, and a conical rubber washer seated on said grooved portion abutting said clinch ring, the peripheral parts of the washer being forced into contact with the bushing by the resiliency of the washer material to thereby seal said control shaft.

3. A sealed control shaft construction for an adjustable electrical device comprise a bushing, a circumferentially grooved control shaft extending through said bushing, a portion of the groove being located within the bushing, means for preventing longitudinal movement of the shaft with respect to the bushing, and a sealing washer seated on said grooved portion, said bushing having a conically tapered recess guide at the inner end thereof to gradually force the washer into sealing position as the control shaft and bushing are assembled.

4. A sealed control shaft construction for an adjustable electrical device comprising a bushing, a circumferentially grooved control shaft extending through said bushing, the inner portion of the groove being located within the bushing and the outer portion of the groove extending outside the bushing, said groove having a length substantially greater than its width, a clinch ring secured to said outer grooved portion to prevent longitudinal movement of the shaft with respect to the bushing, and a conical sealing washer seated on said inner grooved portion abutting said ring, the peripheral parts of the washer being forced into contact with the bushing by the resiliency of the washer material to thereby seal said control shaft.

5. A sealed control shaft construction for an adjustable electrical device comprising a bushing, a circumferentially grooved control shaft extending through said bushing, the inner portion of the groove being located within the bushing and the outer portion of the groove extending outside the bushing, a clinch ring secured to said outer grooved portion to prevent longitudinal movement of the shaft with respect to the bushing, and a sealing washer seated on said inner grooved portion, said bushing having a conically tapered recess guide at the inner end thereof to gradually force the washer into sealing position as the control shaft and bushing are assembled.

6. A sealed control shaft construction for an adjustable electrical device comprising a casing, a bushing extending through the casing, a circumferentially grooved control shaft in said bushing, the inner portion of the groove being located within the bushing and the outer portion of the groove extending outside the bushing, said groove having a length substantially greater than its width, a clinch ring secured to said outer grooved portion and an insulating block washer or stop arm on said shaft bearing against the inner end of said bushing to prevent longitudinal movement of the shaft with respect to the bushing, and a conical sealing washer seated on said inner grooved portion abutting said clinch ring, the peripheral portions of the washer being forced into contact with the bushing by the resiliency of the washer material to thereby seal said control shaft.

OSCAR V. HADLEY.
EARL E. SCHWARZENBACH.

REFERENCES CITED

The following references are of record in the file of this patent:

UNITED STATES PATENTS

| Number | Name | Date |
| --- | --- | --- |
| 1,491,322 | Kellum | Jan. 22, 1924 |
| 2,069,440 | Hathorn | Feb. 2, 1937 |
| 2,134,870 | Fruth | Nov. 1, 1938 |
| 2,182,226 | Geise | Dec. 5, 1939 |
| 2,216,505 | Thornhill | Oct. 1, 1940 |

FOREIGN PATENTS

| Number | Country | Date |
| --- | --- | --- |
| 862 | Great Britain | Mar. 24, 1870 |